(12) United States Patent
Nagata et al.

(10) Patent No.: US 10,341,073 B2
(45) Date of Patent: Jul. 2, 2019

(54) INFORMATION TRANSMISSION METHOD, INFORMATION PROCESSING METHOD, BASE STATION, AND MOBILE STATION

(71) Applicant: NTT DOCOMO, INC., Tokyo (JP)

(72) Inventors: Satoshi Nagata, Tokyo (JP); Yuichi Kakishima, Palo Alto, CA (US); Xi Luan, Beijing (CN); Chongning Na, Beijing (CN); Xiaolin Hou, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/571,518

(22) PCT Filed: Aug. 8, 2016

(86) PCT No.: PCT/JP2016/073336
§ 371 (c)(1),
(2) Date: Nov. 3, 2017

(87) PCT Pub. No.: WO2017/026455
PCT Pub. Date: Feb. 16, 2017

(65) Prior Publication Data
US 2018/0145807 A1 May 24, 2018

(30) Foreign Application Priority Data

Aug. 13, 2015 (CN) .......................... 2015 1 0497275

(51) Int. Cl.
*H04L 5/00* (2006.01)
*H04B 7/06* (2006.01)
(Continued)

(52) U.S. Cl.
CPC ......... *H04L 5/0048* (2013.01); *H04B 7/0617* (2013.01); *H04B 7/0626* (2013.01);
(Continued)

(58) Field of Classification Search
CPC ... H04W 76/27; H04W 72/046; H04W 16/28; H04W 24/00; H04W 72/042;
(Continued)

(56) References Cited

U.S. PATENT DOCUMENTS

2012/0082052 A1* 4/2012 Oteri ...................... H04W 24/10
370/252
2013/0064216 A1* 3/2013 Gao ...................... H04W 72/04
370/330
(Continued)

FOREIGN PATENT DOCUMENTS

EP 2827665 A1 1/2015
JP 2014-053811 A 3/2014
(Continued)

OTHER PUBLICATIONS

Extended European Search Report issued in the counterpart European Patent Application No. 16835152.6, dated Jul. 23, 2018 (9 pages).
(Continued)

*Primary Examiner* — Brian D Nguyen
(74) *Attorney, Agent, or Firm* — Osha Liang LLP

(57) ABSTRACT

An information transmission method used in a base station includes: determining mode indication information regarding reference signals to be transmitted; transmitting the mode indication information to a mobile station; and transmitting the reference signals to the mobile station based on the mode indication information.

9 Claims, 5 Drawing Sheets

(51) Int. Cl.
  *H04W 16/28* (2009.01)
  *H04W 76/27* (2018.01)
  *H04W 24/00* (2009.01)
  *H04B 17/309* (2015.01)
  *H04B 7/08* (2006.01)
  *H04W 72/04* (2009.01)
  *H04W 88/08* (2009.01)

(52) U.S. Cl.
  CPC .......... *H04B 7/0695* (2013.01); *H04B 7/088* (2013.01); *H04B 17/309* (2015.01); *H04L 5/0023* (2013.01); *H04W 16/28* (2013.01); *H04W 24/00* (2013.01); *H04W 72/042* (2013.01); *H04W 72/046* (2013.01); *H04W 76/27* (2018.02); *H04W 88/08* (2013.01)

(58) Field of Classification Search
  CPC ... H04W 88/08; H04B 7/0617; H04B 7/0626; H04B 7/0695; H04B 7/088; H04B 17/309; H04L 5/0023; H04L 5/0048
  See application file for complete search history.

(56) References Cited

U.S. PATENT DOCUMENTS

| | | | | |
|---|---|---|---|---|
| 2013/0194931 | A1* | 8/2013 | Lee | H04L 5/0053 370/241 |
| 2013/0235812 | A1* | 9/2013 | Heo | H04L 5/001 370/329 |
| 2014/0044088 | A1* | 2/2014 | Nogami | H04J 11/0069 370/329 |
| 2014/0050190 | A1* | 2/2014 | Shimezawa | H04L 5/0023 370/329 |
| 2014/0105162 | A1* | 4/2014 | Li | H04W 72/042 370/329 |
| 2015/0304076 | A1* | 10/2015 | Lee, II | H04L 5/005 370/329 |

FOREIGN PATENT DOCUMENTS

| | | |
|---|---|---|
| JP | 2015-126412 A | 7/2015 |
| WO | 2012124552 A1 | 9/2012 |

OTHER PUBLICATIONS

Office Action issued in corresponding Japanese Application No. 2017-534449, dated Feb. 13, 2018 (6 pages).

International Search Report issued in corresponding application No. PCT/JP2016/073336 dated Oct. 25, 2016 (2 pages).

Written Opinion of the International Searching Authority issued in corresponding application No. PCT/JP2016/073336 dated Oct. 25, 2016 (3 pages).

* cited by examiner

INFORMATION TRANSMISSION METHOD, INFORMATION PROCESSING METHOD, BASE STATION, AND MOBILE STATION

TECHNICAL FIELD

The present disclosure relates to a communication technology field, and more specifically to an information transmission method used in a base station in a multi-antenna technology, an information processing method used in a mobile station, a base station, and a mobile station.

BACKGROUND ART

Typically, a base station communicates with a mobile station using a one-dimensional antenna arranged in a horizontal direction. In recent years, in a macro-cell and a micro-cell, the number of radio transmission units sharply increases and the number of mobile stations also increases. To improve signal transmission quality between a base station and a mobile station and to increase throughput of a radio communication system, a full-dimensional beam forming technology has been proposed. According to a full-dimensional beam forming technology, a base station communicates with a mobile station using a two-dimensional antenna array arranged in a horizontal direction and a vertical direction. In the two-dimensional antenna array, antennas are arranged not only in the horizontal direction for horizontal beam control but also in the vertical direction (height direction) for vertical beam control. Thus, full-dimensional beam forming can be realized. Through the full-dimensional beam forming, a higher beam forming gain can be obtained and higher signal transmission quality can be also achieved for mobile stations located at different positions.

It is necessary for a base station to transmit reference signals (RSs) to a mobile station in order for the mobile station to estimate channel state information (CSI) before the base station transmits downlink data to the mobile station. Specifically, a base station can transmit beam-formed (BF) CSI-RS (hereinafter referred to as "BF CSI-RS") beams or non-precoded (NP) CSI-RS (hereinafter referred to as "NP CSI-RS") beams to a mobile station. The mobile station can estimate a channel based on the received beams and feeds a channel estimation result back to the base station. Thus, the base station can transmit downlink data based on the channel estimation result. However, the BF CSI-RS beams typically involve a dedicated transmission and processing method and the NP CSI-RS beams also typically involve a dedicated transmission and processing method. In other words, compatible transmission and processing may not be applied to reference signals in different communication modes. Accordingly, a communication technology for enhancing a capability to process reference signals is preferable.

SUMMARY OF THE INVENTION

Problem to be Solved by the Invention

An object of the present disclosure is to provide an information transmission method used in a base station in a multi-antenna technology, an information processing method used in a mobile station, a base station, and a mobile station capable of not only performing control of a two-dimensional antenna array and but also applying compatible transmission and processing to reference signals in different communication modes by enhancing and improving a capability to process the reference signals.

Means for Solving Problem

According to a first aspect, there is provided an information transmission method used in a base station. The method includes: determining mode indication information regarding reference signals to be transmitted; transmitting the mode indication information to a mobile station; and transmitting the reference signals to the mobile station based on the mode indication information.

According to a second aspect, there is provided an information processing method used in a mobile station. The method includes: receiving mode indication information regarding reference signals to be transmitted from a base station; receiving the reference signals from the base station based on the mode indication information; and obtaining channel state information between the mobile station and the base station based on the received reference signals.

According to a third aspect, there is provided a base station including: a signal generator configured to generate mode indication information regarding reference signals to be transmitted and generate the reference signals to be transmitted based on the mode indication information; and a transmitter configured to transmit the mode indication information and transmit the reference signals.

According to a fourth aspect, there is provided a mobile station including: a receiver configured to receive mode indication information regarding reference signals to be transmitted from a base station and receive the reference signals from the base station based on the mode indication information; and a processor configured to obtain channel state information between the mobile station and the base station based on the received reference signals.

According to the information transmission method, the information processing method, the base station, and the mobile station in the multi-antenna technology, it is possible to enhance and improve a capability to process reference signals by determining and transmitting mode indication information regarding the reference signals and transmitting the reference signals to the mobile station based on the mode indication information. Thus, it is possible to not only perform control of a two-dimensional antenna array and but also apply compatible transmission and processing to the reference signals in different communication modes.

MODE(S) FOR CARRYING OUT THE INVENTION

Figure 1:
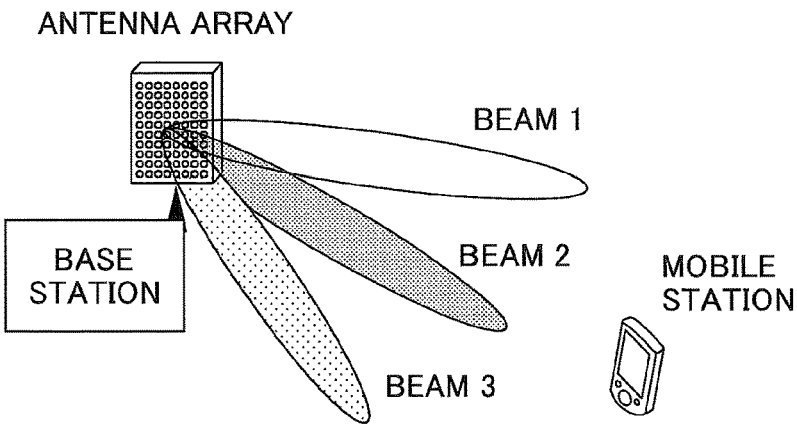
FIG. 1 is a diagram illustrating a radio communication system to which an embodiment of the present disclosure can be applied.

Hereinafter, a solution according to an embodiment of the present disclosure will be described in detail with reference to the accompanying drawings. Embodiments to be described are some of the embodiments of the present disclosure and are not all of the embodiments.

The solution according the embodiment of the present disclosure can be applied to various communication systems, for example, a code division multiple access (CDMA) system, a wideband code division multiple access wireless (WCDMA) system, a Long term Evolution (LTE) system, an LTE-Advanced system, a TD-LTE system, and other wideband communication systems.

In a communication system, a mobile station can communicate with one or more core networks via a radio access network (RAN). A mobile station may be a mobile phone, a portable mobile apparatus, a handheld mobile apparatus, a mobile apparatus embedded in a computer, or an in-vehicle mobile apparatus, which can exchange voice and/or data over the radio access network.

The terms "system" and "network" used in the present specification are interchangeably used.

A base station may be a base station (BTS: base transceiver station) in a CDMA system, may be a base station (NodeB) in a WCDMA system, may be an evolved base station (eNB, e-NodeB, or evolutional NodeB) or a home base station (HeNB or Home-NodeB) in an LTE or LTE-Advanced system, or may be a relay node (RN) in an LTE-Advanced system, which is not limited in embodiments of the present disclosure.

A base station can accommodate one or more (for example, three) cells (also referred to as "sectors"). When a base station accommodates a plurality of cells, the entire coverage area of the base station can be divided into a plurality of smaller areas and a communication service can be also provided in each of the smaller areas using a base station subsystem (for example, an indoor small-sized base station remote radio head (RRH)). The term "cell" or "sector" refers to a part or all of a coverage area of a base station and/or a base station subsystem that provides a communication service in the coverage area. Further, the terms, "base station," "eNB," "cell," and "sector" can be interchangeably used in the present specification. A base station can be also referred to as the term such as a fixed station, a NodeB, an eNodeB (eNB), an access point, a femtocell, or a small cell.

A mobile station is referred to as a subscriber station, a mobile unit, a subscriber unit, a radio unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several other appropriate terms by those skilled in the art.

For convenience, an LTE communication system, a base station eNB, and a user equipment UE (that is, a mobile station) in the LTE communication system will be described as an example below. In the machine type communication, the user equipment UE is a machine type communication terminal.

FIG. 1 is a diagram illustrating a radio communication system to which an embodiment of the present disclosure can be applied. As illustrated in FIG. 1, the radio communication system may include at least one base station and at least one mobile station. The base station is connected to a higher-layer apparatus (not illustrated) and the higher-layer apparatus is connected to a core network (not illustrated). The base station includes a one-dimensional or two-dimensional antenna array and can communicate with the mobile station using the antenna array.

Before the base station transmits downlink data to the mobile station, the base station transmits reference signals to the mobile station used to estimate channel state information CSI. A reference signal can be abbreviated to an RS, and can be also referred to as a pilot depending on a standard to be applied. When the reference signals are BF CSI-RSs, the base station performs precoding using a corresponding precoding vector. Thus, beams (three beams illustrated in FIG. 1) of reference signals with different directions on different antenna ports are generated. Thereafter, the beams are subsequently transmitted to the mobile station from the antennas of the antenna array. When the reference signals are NP CSI-RSs, the base station generates beams (not illustrated in FIG. 1) of reference signals with the same direction on different antenna ports without performing precoding. The mobile station receives the beams to estimate a channel, selects at least one beam based on a channel estimation result, and feeds the selected beam back to the base station. Thus, the base station can transmit downlink data based on the feedback.

In FIG. 1, only one base station and only one mobile station are illustrated, but more than one base stations or mobile stations may be present. In FIG. 1, three beams of reference signals according to a beam forming process are illustrated, but the number of beams can be increased or decreased as needed. Further, the reference signals mentioned herein may be the CSI-RSs, or may be common reference signals (CRSs) or demodulation reference signals (DMRSs). Alternatively, appropriate signals such as primary synchronization signals (PSSs) or secondary synchronization signals (SSSs) may be used to fulfill the role of the reference signals. Hereinafter, embodiments of the present disclosure will be described using the CSI-RSs as reference signals for convenience. However, the description can be similarly applied to other types of reference signals.

Typically, it is necessary for the base station to initially transmit configuration information to the mobile station. The configuration information indicates, for example, a resource (for example, a time resource and a frequency resource) on which the beam of each antenna port of the base station is positioned. The mobile station can receive the beam of each port on the corresponding resource based on the configuration information, and thus can estimate a channel state from each port to the mobile station. Since BF CSI-RS beams of the related art involve a dedicated transmission and processing method and NP CSI-RS beams of the related art also involve a dedicated transmission and processing method, compatible transmission and processing cannot be applied to reference signals in different communication modes. In the related art, by using the configuration information for the reference signals, only arrangement of a one-dimensional antenna array in a horizontal direction can be typically indicated, but arrangement of a two-dimensional antenna array or ports in a horizontal direction and a vertical direction cannot indicated.

In view of these situations, in an embodiment of the present disclosure, the base station can transmit configuration information and mode indication information of reference signals before transmitting the reference signals, and also transmit the reference signals to the mobile station based on both the mode indication information and the configuration information. The mobile station can identify a transmission scheme of the reference signals or ascertain dimension number information of the reference signals based on the mode indication information. Therefore, the reference signals can be received and processed by adopting an appropriate method. Accordingly, it is possible to not only perform control of a two-dimensional antenna array but also apply compatible transmission and processing to reference signals in different communication modes by enhancing and improving the capability to process reference signals.

Figure 2:
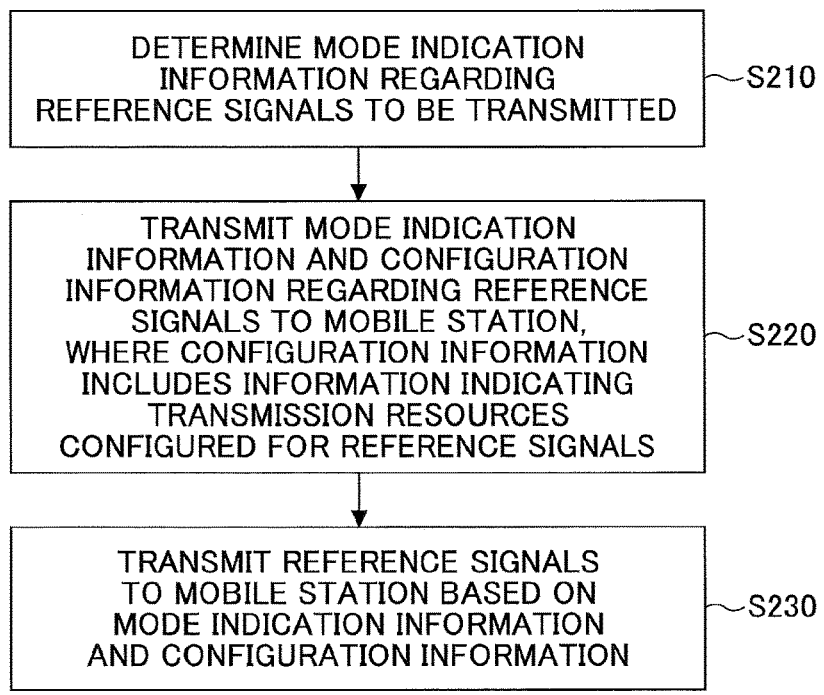
FIG. 2 is a flowchart illustrating an information transmission method used in a base station according to an embodiment of the present disclosure.

FIG. 2 is a flowchart illustrating an information transmission method 200 used in a base station according to an embodiment of the present disclosure. The information transmission method 200 can be applied to the base station illustrated in FIG. 1. As illustrated in FIG. 2, the information transmission method 200 used in the base station includes the steps of: determining mode indication information regarding reference signals to be transmitted (S210); transmitting the mode indication information and configuration information regarding the reference signals to the mobile station, the configuration information including information indicating transmission resources configured for the reference signals (S220); and transmitting the reference signals to the mobile station based on the mode indication information and the configuration information (S230).

In S210, at least one of dimension number information of the reference signals and transmission scheme information of the reference signals may be determined as the mode indication information. The mode indication information is used to indicate a transmission mode of the reference signals. In practice, the information can be appropriately selected as needed. For example, when the transmission scheme of the reference signals is determined as BF CSI-RS beams, the dimension number information of the reference signals may be selected as the mode indication information. When the transmission scheme of the reference signals is not determined, the transmission scheme information of the reference signals may be selected as the mode indication information. For example, the mode indication information may be used to indicate whether the reference signals are BF CSI-RSs or NP CSI-RSs.

When the mode indication information includes the dimension number information of the reference signals and it is assumed that the reference signals are BF CSI-RSs, for example, the reference signals may be two-dimensional signals in a vertical direction and a horizontal direction. The dimension number information of the reference signals may include at least one of a distribution of the reference signals in the vertical direction and a distribution of the reference signals in the horizontal direction. For example, the dimension number information can indicate whether the reference signals are one-dimensional signals in the horizontal direction or one-dimensional signals in the vertical direction. The dimension number information can also indicate that the reference signals are two-dimensional signals in the horizontal direction and the vertical direction. Since the distribution of the reference signals in at least one of the horizontal direction and the vertical direction can be identified based on the dimension number information, configuration information corresponding to the distribution of the reference signals in the vertical direction can be obtained or configuration information corresponding to the distribution of the reference signals in the horizontal direction can be obtained. Thus, it is possible to increase the number of reference signals and it is possible to accordingly increase the number of radio transmission units or the number of mobile stations.

When the mode indication information includes transmission scheme information of the reference signals, the transmission scheme information is used to indicate a transmission scheme of the reference signals. For example, the transmission scheme information is used to indicate whether the reference signals are BF CSI-RSs or NP CSI-RSs. This is merely an example and, for example, the transmission scheme information may also indicate that the reference signals are either common reference signals or demodulation reference signals. Alternatively, the transmission scheme information may further indicate that the reference signals are either primary synchronization signals or secondary synchronization signals. The embodiment of the present disclosure is not limited to a specific scheme which can be indicated by the transmission scheme information.

In S220, the mode indication information determined in S210 and configuration information regarding the reference signals are transmitted to the mobile station. The configuration information of the reference signals includes information indicating transmission resources configured for the reference signals. The information of the transmission resources configured for the reference signals may include, for example, at least one of a time resource and a frequency resource for transmitting each reference signal or may include information regarding an antenna port number or a beam identifier corresponding to the reference signal, the number of antennas, and the like. Based on the configuration information, the mobile station can receive each reference signal and identify the corresponding antenna port number.

The mode indication information may be transmitted along with the configuration information or may be transmitted separately from the configuration information. Alternatively, by transmitting the configuration information, it is possible to implicitly transmit the mode indication information. The embodiment of the present disclosure is not limited to the specific transmission method for the mode indication information and the configuration information.

As an example, in S220, the mode indication information may be transmitted to the mobile station using at least one of radio resource control (RRC) signaling and downlink control information (DCI) of a physical downlink control channel (PDCCH), and the configuration information may be transmitted using the radio resource control signaling. In this embodiment, the mode indication information and the configuration information are separately transmitted and the mode indication information is transmitted with a dedicated information bit. In other words, the mode indication information is transmitted in accordance with an explicit method.

As an example, the dimension number information of the reference signals may be indicated by inserting a dimension number indication bit into the radio resource control RRC signaling or the DCI. When the value of the dimension number indication bit is 0, it indicates that the reference signals are one-dimensional signals in the horizontal direction. When the value of the dimension number indication bit is 1, it indicates that the reference signals are two-dimensional signals in the horizontal direction and the vertical direction. Alternatively, the dimension number indication bit may be used to indicate the distribution of the reference signals in the vertical direction. For example, when the dimension number indication bits are 00, the number of sets of the reference signals in the vertical direction may indicate 1. When the dimension number indication bits are 01, the number of sets of the reference signals in the vertical direction may indicate 2. When the dimension number indication bits are 10, the number of sets of the reference signals in the vertical direction may indicate 3. When the dimension number indication bits are 11, the number of sets of the reference signals in the vertical direction may indicate 4. The transmission scheme of the reference signals may be indicated by inserting a scheme indication bit into the radio resource control RRC signaling or the DCI. For example, when the scheme indication bit is 0, it may indicate that the reference signals are BF CSI-RSs. When the scheme indication bit is 1, it may indicate that the reference signals are NP CSI-RSs. The embodiment of the present disclosure is not limited to a relationship between a numerical value of the scheme indication bit and the transmission scheme of the reference signals as long as the scheme indication bit can be used to identify the transmission scheme of the reference signals.

Typically, in the communication system, a transmission period of RRC signaling is relatively long and a transmission period of downlink control information DCI is relatively short. Therefore, when the mode indication information is transmitted using the downlink control information DCI, the transmission of the mode indication information can be controlled more flexibly. The configuration information is typically transmitted using the radio resource control signaling. For example, configuration information of the reference signals corresponding to different antenna ports may be transmitted in a physical resource block.

Alternatively, in S220, the mode indication information may be transmitted in accordance with an implicit method without using a dedicated information bit. For example, when the configuration information is transmitted, the mode indication information can be implicitly indicated. Specifically, a configuration information list related to the reference signals may be transmitted to the mobile station using the radio resource control signaling. The configuration information list includes one or more configuration information blocks each having an identification number. List-related information of the configuration information list is used to indicate the mode indication information.

Typically, the configuration information includes only one configuration information block and information of the transmission resources of the reference signals and the like is indicated using information in the configuration information block. In this embodiment, the configuration information list is considered as configuration information and the number of configuration information blocks included in the configuration information list is not limited to 1. The list-related information of the configuration information list may include, for example, at least one of identification numbers of the configuration information blocks, a subframe number in which the configuration information list is positioned, and the number of configuration information blocks in the configuration information list. The identification numbers of the configuration information blocks may be, for example, 1, 2, 3, 4, 5, and the like.

For CSI-RSs, a CSI configuration information list may be used as the configuration information. The CSI configuration information list may be transmitted in one CSI process or may be transmitted in different CSI processes. The embodiment of the present disclosure is not limited to the process in which the configuration information list can be transmitted.

When the mode indication information includes the transmission scheme information of the reference signals and the maximum identification number in the configuration information list is an odd number (for example, 1, 3, or 5), the reference signals may be determined as NP CSI-RSs. When the maximum identification number in the configuration information list is an even number (for example, 2 or 4), the reference signals may be determined as BF CSI-RSs. Alternatively, when the configuration information list is located in a subframe 2, the reference signals may be determined as NP CSI-RSs. When the configuration information list is located in a subframe 4 or 5, the reference signals may be determined as BF CSI-RSs. Alternatively, when the number of configuration information lists is 2 and each configuration information list includes two configuration information blocks, the reference signals may be determined as NP CSI-RSs. When one configuration information list includes three configuration information blocks and another configuration information list includes one configuration information block, the reference signals may be determined as BF CSI-RSs.

When the mode indication information includes the dimension number information of the reference signals, for example, the number of configuration information blocks in the configuration information list may correspond to the dimension number of the reference signals in the vertical direction. Specifically, when the configuration information list includes one configuration information block, it may indicate that the reference signals are present at one vertical height. When the configuration information list includes two configuration information blocks, it may indicate that the reference signals are present at two vertical heights. When the configuration information list includes three configuration information blocks, it may indicate that the reference signals are present at three vertical heights (another example can be deduced by analogy based on this). The configuration information block corresponding to each vertical height may include the configuration information of the reference signals in the horizontal direction. Further, the dimension number information of the reference signals may be implicitly indicated using the subframe in which the configuration information list is positioned. For example, when the configuration information list is located in a subframe 2, it may indicate that the reference signals are signals only in the horizontal direction. When the configuration information list is located in a subframe 3, it may indicate that the reference signals are signals in the horizontal direction and the vertical direction and the reference signals are present at one vertical height. When the configuration information list is located in a subframe 4, it may indicate that the reference signals are signals in the horizontal direction and the vertical direction and the reference signals are present at two vertical heights. In practice, the list-related information may be comprehensively used to indicate one or more pieces of mode indication information.

The implicit method and the explicit method may be combined to indicate the mode indication information. For example, the step (S220) of transmitting the mode indication information and the configuration information regarding the reference signals to the mobile station may include: transmitting the mode indication information to the mobile station using at least one of the radio resource control signaling and the downlink control information of the physical downlink control channel; and transmitting the configuration information list related to the reference signals to the mobile station using the radio resource control signaling. The configuration information list may include one or more configuration information blocks each having the identification number, and the list-related information of the configuration information list may be used to indicate the mode indication information. By enhancing the transmission of the mode indication information in this way, it is possible to ensure that the mobile station can reliably perform reception and accurately identify specific content.

In S230, the reference signals are transmitted to the mobile station based on the mode indication information and the configuration information. For example, when the transmission scheme information in the mode indication information indicates that the reference signals are NP CSI-RSs, each reference signal can be transmitted using a resource indicated by the configuration information in which each reference signal is positioned without performing precoding. When the transmission scheme information in the mode indication information indicates that the reference signals are BF CSI-RSs, precoding can be performed and each reference signal can be transmitted using a resource indicated by the configuration information in which each reference signal is positioned. When the dimension number information in the mode indication information indicates that the reference signals are signals in the horizontal direction, each reference signal can be transmitted based on a resource indicated by the configuration information in which each reference signal is positioned with each azimuth angle in the horizontal direction. When the dimension number information in the mode indication information indicates that the reference signals are signals in the horizontal direction and the vertical direction, each reference signal can be transmitted based on a resource indicated by the configuration information in which each reference signal is positioned with a corresponding azimuth angle in the horizontal direction and a corresponding elevation angle in the vertical direction.

Based on the reference signals, the mobile station can calculate channel state information corresponding to transmission paths of the reference signals. The channel state information may be, for example, information regarding a channel quality indication, a precoding matrix indication, or a rank indication. The mobile station can feed information such as the channel state information and a port number back to the base station. Accordingly, the base station can receive feedback information from the mobile station. The feedback information includes the channel state information obtained based on the reference signals by the mobile station. The base station can determine a channel state between the mobile station and each antenna port of the base station based on the feedback information and thus can perform data communication with the mobile station adopting an appropriate method.

In the solution of the information transmission method in the multi-antenna technology according to the embodiment of the present technology, it is possible to enhance and improve the capability to process reference signals by determining and transmitting, by the base station, the mode indication information regarding the reference signals and transmitting the reference signals to the mobile station based on the mode indication information. Thus, it is possible to not only perform control of the two-dimensional antenna array but also apply compatible transmission and processing to the reference signals in different communication modes.

Figure 3:
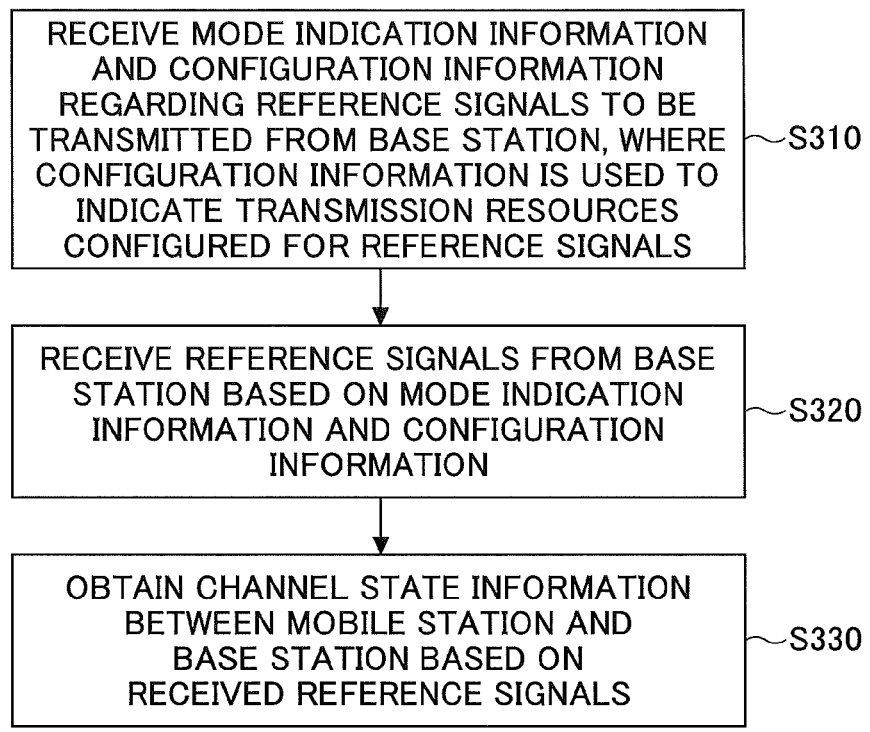
FIG. 3 is a flowchart illustrating an information processing method used in a mobile station according to an embodiment of the present disclosure.

FIG. 3 is a flowchart illustrating an information processing method 300 used in a mobile station according to an embodiment of the present disclosure. The information processing method 300 can be applied to the mobile station illustrated in FIG. 1. As illustrated in FIG. 3, the information processing method 300 includes the steps of: receiving mode indication information and configuration information regarding reference signals to be transmitted from the base station, where the configuration information is used to indicate transmission resources configured for the reference signals (S310); receiving the reference signals from the base station based on the mode indication information and the configuration information (S320); and obtaining channel state information between the mobile station and the base station based on the received reference signals (S330). In addition, steps S310 and S320 performed by the mobile station in FIG. 3 correspond to steps S220 and S230 performed by the base station in FIG. 2.

In S310, the mobile station receives mode indication information and configuration information regarding reference signals from the base station. The mode indication information is used to indicate a transmission mode of the reference signals and may include, for example, at least one of dimension number information of the reference signals and transmission scheme information of the reference signals. The dimension number information of the reference signals may include at least one of a distribution of the reference signals in the vertical direction and a distribution of the reference signals in the horizontal direction. For example, the transmission scheme information of the reference signals can indicate whether the reference signals are BF CSI-RSs or NP CSI-RSs. The configuration information may be used to indicate transmission resources configured for the reference signals. Information regarding the transmission resources configured for the reference signals may include, for example, at least one of a time resource and a frequency resource for transmitting each reference signal or may include information regarding an antenna port number or a beam identifier corresponding to the reference signal, the number of antennas, and the like.

According to a transmission method of transmitting the mode indication information and the configuration information by the base station, the mobile station can receive the mode indication information and the configuration information by adopting a corresponding reception method. Specifically, when the base station separately transmits the mode indication information and the configuration information, the mobile station can separately receive and process the mode indication information and the configuration information. Alternatively, when the base station implicitly includes the mode indication information in the configuration information, the mobile station can receive the configuration information and can obtain the mode indication information from the configuration information. The embodiment of the present disclosure is not limited to the specific reception method for the mode indication information and the configuration information.

As an example, in step S310, the mode indication information may be received from the base station using at least one of radio resource control signaling and downlink control information of the physical downlink control channel, and the configuration information of the reference signals may be received using the radio resource control signaling. In this embodiment, the mode indication information can use a dedicated control bit to explicitly indicate that the mobile station separately receives the mode indication information and the configuration information.

As an example, the dimension number information of the reference signals can be obtained from a dimension number indication bit in the radio resource control RRC signaling or the DCI. For example, when the value of the dimension number indication bit received by the mobile station is 0, the mobile station determines that the reference signals are one-dimensional signals in the horizontal direction. When the value of the dimension number indication bit received by the mobile station is 1, the mobile station determines that the reference signals are two-dimensional signals in the horizontal direction and the vertical direction. Alternatively, the mobile station can determine a distribution of the reference signals in the vertical direction based on a numerical value of the dimension number bit. For example, when the dimension number indication bits are 00, the mobile station may determine that the number of sets of the reference signals in the vertical direction is 1. When the dimension number indication bits are 01, the mobile station may determine that the number of sets of the reference signals in the vertical direction is 2. When the dimension number indication bits are 10, the mobile station may determine that the number of sets of the reference signals in the vertical direction is 3. When the dimension number indication bits are 11, the mobile station may determine that the number of sets of the reference signals in the vertical direction is 4. Further, the mobile station can also extract a scheme indication bit from the radio resource control RRC signaling or the DCI and determine the transmission scheme information of the reference signals. For example, when the scheme indication bit is 0, the mobile station may determine that the reference signals are BF CSI-RSs. When the scheme indication bit is 1, the mobile station may determine that the reference signals are NP CSI-RSs. The embodiment of the present disclosure is not limited to a relationship between a numerical value of the scheme indication bit and the transmission scheme of the reference signals as long as the scheme indication bit can be used to identify the transmission scheme of the reference signals.

The configuration information is typically transmitted using the radio resource control signaling. For example, the mobile station can receive the configuration information of the reference signals corresponding to different antenna ports in a physical resource block. The RRC signaling or the DCI is used to transmit control information. However, since the transmission resources are limited, the occupied transmission resources can be reduced by reducing content of the mode indication information. For example, the mobile station may first receive the mode indication information, determine dimension number information of the reference signals (for example, a distribution of the reference signals in the vertical direction) based on the dimension number indication bit in the mode indication information, and receive the configuration information corresponding to the dimension number information from the base station based on the dimension number information.

To reduce the resources occupied by the transmission mode indication information and enhance the transmission of the mode indication information, a part of the mode indication information may be implicitly included in the configuration information and transmitted. For example, during reception of the configuration information using the radio resource control signaling, a configuration information list related to the reference signals may be received from the base station using the radio resource control signaling. The configuration information list includes one or more configuration information blocks each having an identification number. The list-related information of the configuration information list is used to indicate the mode indication information. In this way, it is possible to ensure that the mobile station can reliably receive each piece of mode indication information and accurately identify specific content.

The mode indication information may be fully included in the configuration information and transmitted. Therefore, the mobile station may not receive the mode indication information from the base station using at least one of the radio resource control signaling and the downlink control information but may receive the mode indication information and the configuration information regarding the reference signals from the base station as follows, that is, receive the configuration information list related to the reference signals from the base station. The configuration information list includes one or more configuration information blocks each having the identification number, and the list-related information of the configuration information list is used to indicate the mode indication information. In this embodiment, the configuration information list is considered as the configuration information. The number of configuration information blocks included in the configuration information list is not limited to 1 and the mode indication information is implicitly included in the configuration information block and transmitted. The list-related information of the configuration information list may include, for example, at least one of identification numbers of the configuration information blocks, a subframe number in which the configuration information list is positioned, and the number of configuration information blocks in the configuration information list.

The mobile station can determine the transmission scheme information in the mode indication information based on the identification numbers of the configuration information blocks. For example, when the maximum identification number in the configuration information list is an odd number, the mobile station may determine that the reference signals are NP CSI-RSs. When the maximum identification number in the configuration information list is an even number, the mobile station may determine that the reference signals are BF CSI-RSs. Alternatively, the mobile station can determine the transmission scheme information based on the subframe in which the configuration information is positioned. For example, when the configuration information list is located in a subframe 2, the mobile station may determine that the reference signals are NP CSI-RSs. When the configuration information list is positioned in a subframe 4 or 5, the mobile station may determine that the reference signals are BF CSI-RSs.

The mobile station can also determine the dimension number information in the mode indication information based on the number of configuration information blocks. Specifically, when the configuration information list includes one configuration information block, the mobile station may determine that the reference signals are present at one vertical height. When the configuration information list includes two configuration information blocks, the mobile station may determine that the reference signals are present at two vertical heights (another example can be deduced by analogy based on this). The mobile station can also determine the dimension number information of the reference signals based on the subframe in which the configuration information list is positioned. For example, when the configuration information list is located in a subframe 2, the mobile station may determine that the reference signals are signals only in the horizontal direction. When the configuration information list is located in a subframe 3, the mobile station may determine that the reference signals are signals in the horizontal direction and the vertical direction and the reference signals are present at one vertical height. When the configuration information list is located in a subframe 4, the mobile station may determine that the reference signals are signals in the horizontal direction and the vertical direction and the reference signals are present at two vertical heights. In practice, the list-related information may be comprehensively used to indicate one or more pieces of mode indication information.

After obtaining the mode indication information and the configuration information in S310, the mobile station receives the reference signals from the base station based on the mode indication information and the configuration information in S320. Based on the mode indication information and the configuration information, the mobile station can receive each reference signal and identify the corresponding antenna port number.

When the dimension number information of the reference signals includes the distribution of the reference signals in the vertical direction and the distribution of the reference signals in the horizontal direction, the dimension number information of the reference signals is received and the configuration information corresponding to the dimension number information is received from the base station based on the dimension number information in S310. In S320, the reference signals in the vertical direction and the horizontal direction are received based on the configuration information corresponding to the dimension number information. For example, the dimension number information can indicate that the reference signals are one-dimensional signals in the horizontal direction or the reference signals are one-dimensional signals in the vertical direction, or can also indicate that the reference signals are two-dimensional signals in the horizontal direction and the vertical direction. Based on the dimension number information, the mobile station can identify the distribution of the reference signals in at least one of the horizontal direction and the vertical direction in S320, and thus can obtain the configuration information corresponding to the distribution of the reference signals in the vertical direction or can obtain the configuration information corresponding to the distribution of the reference signals in the horizontal direction. Accordingly, it is possible to increase the number of reference signals and it is possible to accordingly increase the number of radio transmission units or the number of mobile stations.

When the transmission scheme information in the mode indication information indicates that the reference signals are NP CSI-RSs, each non-precoded (NP) reference signal can be received using a resource indicated by the configuration information in which each reference signal is positioned. When the transmission scheme information in the mode indication information that the reference signals are BF CSI-RSs, the beam-formed reference signals in different directions can be received using a resource indicated by the configuration information in which each reference signal is positioned. The transmission scheme information is used to indicate the transmission scheme of the reference signals. Based on the transmission scheme indicated by the transmission scheme information, the reference signals can be received using an appropriate reception method in S320.

The description that the received reference signals are BF CSI-RSs or NP CSI-RSs is merely an example. The transmission scheme information may further indicate that the reference signals are either common reference signals or demodulation reference signals. Alternatively, the transmission scheme information may indicate that the reference signals are either primary synchronization signals or secondary synchronization signals. The embodiment of the present disclosure is not limited to the specific scheme which can be indicated by the transmission scheme information.

In S330, the channel state information between the mobile station and the base station can be obtained based on the received reference signals. Based on the received reference signal corresponding to each antenna port, the mobile station can calculate channel state information of a transmission path from each antenna port to the mobile station. The channel state information may be, for example, information regarding signal scattering, fading due to an environment, or fading due to a distance. Each transmission path can be indicated using the antenna port or may be indicated using the beam identifier. Accordingly, the mobile station can estimate a channel environment in a multi-antenna system.

As described above, when the base station transmits the reference signals using different schemes, it is also necessary for the mobile station to receive the reference signals using different schemes and obtain channel state information adopting different methods. For example, BF CSI-RS beams of the related art involve a dedicated transmission and processing method and NP CSI-RS beams of the related art also involve a dedicated transmission and processing method. Therefore, in S330, based on the transmission scheme information in the mode indication information, it is necessary to determine whether the reference signals are BF CSI-RSs or NP CSI-RSs. When the reference signals are BF CSI-RSs, a first process is performed on the reference signals to obtain the channel state. When the reference signals are NP CSI-RSs, a second process is performed on the reference signals to obtain the channel state. The second process is different from the first process.

When the reference signals are BF CSI-RSs, the mobile station may perform the first process as follows. That is, the mobile station calculates the channel state information, the antenna port number, and the like corresponding to each reference signal and determines an optimum reference signal which has an optimum channel condition and the corresponding antenna port number based on the calculated channel state information. The mobile station can feed the channel state information, the antenna port number, and the like corresponding to the optimum reference signal back to the base station. When the reference signals are NP CSI-RSs, the mobile station may perform the second process as follows. That is, the mobile station can calculate the channel state information, the antenna port number, and the like corresponding to each reference signal and combine the calculated channel state information to obtain new comprehensive channel state information.

The mobile station can further feed information regarding the channel state information, the port number, and the like back to the base station. The base station can determine the channel state between the mobile station and each antenna port of the base station based on the feedback information, and accordingly can perform data communication with the mobile station adopting an appropriate method. Therefore, the mobile station can transmit the channel state information to the base station and receive communication data from the base station. The communication data is transmitted based on the channel state.

When the reference signals are BF CSI-RSs, the mobile station can feed the channel state information, the antenna port, and the like corresponding to the optimum reference signal as feedback information back to the base station. Alternatively, the mobile station may feed the channel state information, the antenna port numbers, and the like of a predetermined number (for example, 3 or 5) of reference signals with higher priority of the channel condition back to the base station or may feed the channel state information, the antenna port numbers, and the like corresponding to all the reference signals back to the base station. When the reference signals are NP CSI-RSs, the mobile station can transmit the obtained new comprehensive channel state information to the base station.

In the solution of the information processing method used in the mobile station according to the embodiment of the present disclosure, the base station can determine and transmit the mode indication information regarding the reference signals and the mobile station can receive the reference signals from the base station based on the mode indication information, and thus it is possible to enhance and improve the capability to process reference signals. Thus, it is possible to not only perform control of a full-dimensional antenna array and but also apply compatible transmission and processing to the reference signals in different communication modes.

Figure 4:
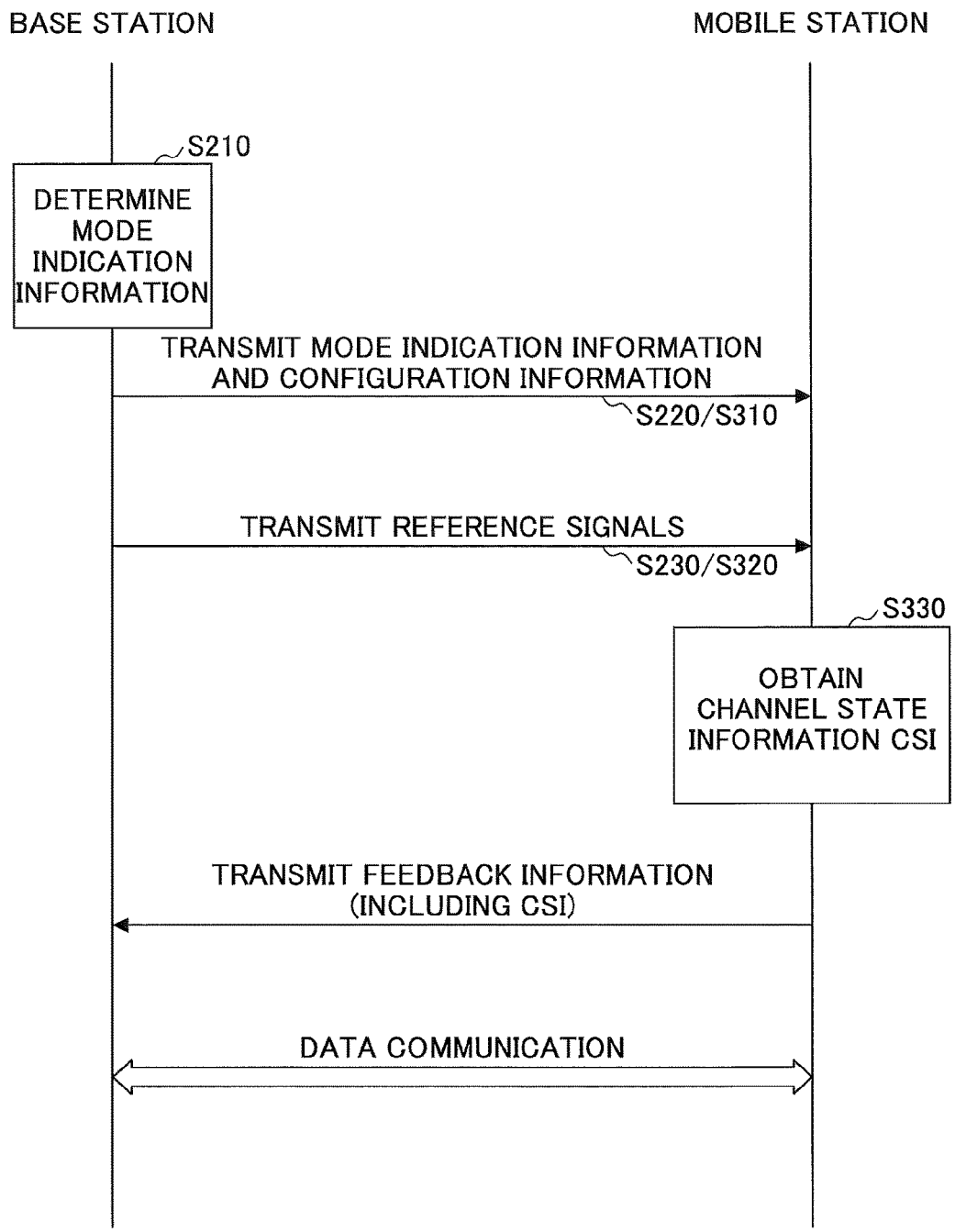
FIG. 4 is a flowchart illustrating a process in a communication system according to an embodiment of the present disclosure.

FIG. 4 is a flowchart illustrating a process in a communication system according to an embodiment of the present disclosure. As illustrated in FIG. 4, the communication system includes a base station and a mobile station. The base station performs the information transmission method described with reference to FIG. 2. The mobile station performs the information processing method described with reference to FIG. 3.

As illustrated in FIG. 4, in S210, the base station determines mode indication information regarding reference signals to be transmitted. The mode indication information may include, for example, at least one of dimension number information of the reference signals and transmission scheme information of the reference signals. In S220 (that is, S310 of FIG. 3), the base station transmits the mode indication information and configuration information regarding the reference signals to the mobile station. The configuration information includes information for indicating transmission resources configured for the reference signals. The mode indication information and the configuration information may separately be transmitted or the mode indication information may be included in the configuration information and implicitly transmitted. In S230 (that is, S320 of FIG. 3), the base station transmits the reference signals to the mobile station based on the mode indication information and the configuration information. In S330, the mobile station obtains channel state information between the mobile station and the base station based on the received reference signals. Thereafter, the mobile station transmits feedback information including the channel state information to the base station and the base station performs data communication with the mobile station adopting an appropriate method based on the received feedback information.

Figure 5:
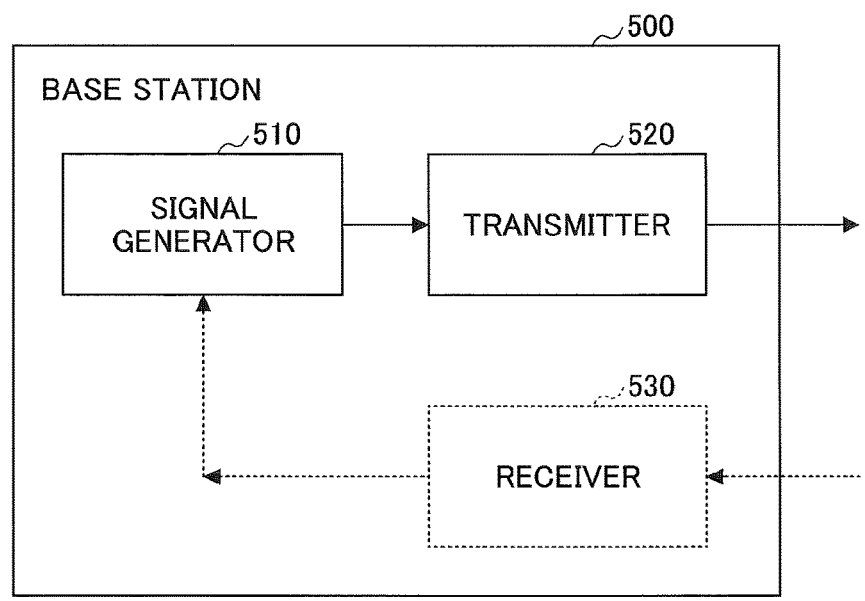
FIG. 5 is a block diagram illustrating a base station according to an embodiment of the present disclosure.

FIG. 5 is a block diagram illustrating a base station 500 according to an embodiment of the present disclosure. The base station 500 corresponds to the base station illustrated in FIG. 1. As illustrated in FIG. 5, the base station 500 includes a signal generator 510 and a transmitter 520. The signal generator 510 is used to generate mode indication information regarding reference signals to be transmitted and configuration information regarding the reference signals and generate the reference signals to be transmitted based on the mode indication information and the configuration information. The configuration information includes information indicating transmission resources configured for the reference signals. The transmitter 520 is used to transmit the mode indication information and the configuration information and subsequently transmit the reference signals.

The base station 500 may further include other components, for example, components performing modulation, encoding, or the like, in addition to the signal generator 510 and the transmitter 520. Since the components are not directly related to content in the embodiment of the present disclosure, the components are not illustrated and not described.

The mode indication information generated by the signal generator 510 may include at least one of dimension number information of the reference signals and transmission scheme information of the reference signals. The reference signals may be two-dimensional signals in the vertical direction and the horizontal direction. The dimension number information may include at least one of the distribution of the reference signals in the vertical direction and the distribution of the reference signals in the horizontal direction. The mode indication information is used to indicate the transmission mode of the reference signals.

For the reference signals whose transmission scheme has been already determined, the signal generator 510 may generate the dimension number information of the reference signals as the mode indication information. For the reference signals whose transmission scheme has not been determined, the signal generator 510 may generate the transmission scheme information of the reference signals and include the transmission scheme information in the mode indication information. Based on the dimension number information, the distribution of the reference signals in at least one of the horizontal direction and the vertical direction can be identified. Thus, the configuration information corresponding to the distribution of the reference signals in the vertical direction or the configuration information corresponding to the distribution of the reference signals in the horizontal direction can be obtained. In this way, it is possible to increase the number of reference signals and it is possible to accordingly increase the number of radio transmission units or the number of mobile stations.

For example, the transmission scheme information is used to indicate whether the reference signals are BF CSI-RSs or NP CSI-RSs. This is merely an example and the transmission scheme information may indicate that the reference signals are either common reference signals or demodulation reference signals. Alternatively, the transmission scheme information may indicate that the reference signals are either primary synchronization signals or secondary synchronization signals. The embodiment of the present disclosure is not limited to a specific scheme which can be indicated by the transmission scheme information.

The signal generator 510 can further generate the configuration information regarding the reference signals. The configuration information includes information for indicating the transmission resources configured for the reference signals. For example, the transmission resources configured for the reference signals may include at least one of a time resource and a frequency resource for transmitting each reference signal and may include information regarding an antenna port number or a beam identifier corresponding to the reference signal, the number of antennas, and the like. Based on the configuration information, the mobile station can receive each reference signal and identify the corresponding antenna port number.

To transmit the mode indication and the configuration information, the signal generator 510 may include the mode indication information in at least one of the radio resource control signaling and the downlink control information of the physical downlink control channel and include the configuration information in the radio resource control signaling. In this embodiment, the mode indication information and the configuration information are separately transmitted and the mode indication information is transmitted using a dedicated information bit. In other words, the mode indication information is transmitted in accordance with an explicit method.

As an example, the signal generator 510 can insert the dimension number indication bit in the radio resource control RRC signaling or the DCI to indicate the dimension number information of the reference signals. The dimension number indication bit can indicate that the reference signals are one-dimensional signals or two-dimensional signals and can also indicate the distribution of the reference signals in the vertical direction. The signal generator 510 can insert the scheme indication bit in the radio resource control RRC signaling or the DCI to indicate the transmission scheme of the reference signals. In a communication system, a transmission period of RRC signaling is relatively long and a transmission period of downlink control information DCI is relatively short. Therefore, when the mode indication information is transmitted using the downlink control information DCI, the signal generator 510 can control the transmission of the mode indication information more flexibly.

The signal generator 510 can generate the mode indication information in accordance with an implicit method without transmitting the mode indication information using the dedicated information bit. For example, the signal generator 510 can implicitly indicate the mode indication information using the configuration information. Specifically, the signal generator can generate a configuration information list regarding the reference signals as the configuration information and include the configuration information list in the radio resource. The generated configuration information is the configuration information list related to the reference signals, the configuration information list includes one or more configuration information blocks each having an identification number, and the list-related information of the configuration information list is used to indicate the mode indication information. The list-related information of the configuration information list may include at least one of identification numbers of the configuration information blocks, a subframe number in which the configuration information list is positioned, and the number of configuration information blocks in the configuration information list.

As an example in which the mode indication information is generated in accordance with the implicit method, the signal generator 510 can indicate different transmission schemes of the reference signals using the odd and even characteristics of the maximum identification number in the configuration information list, can indicate different transmission schemes of the reference signals using a subframe 2 in which the configuration information list is positioned, or can indicate different transmission schemes of the reference signals using different distributions of the configuration information blocks in different configuration information lists. The signal generator 510 can further indicate the distribution of the reference signals in the vertical direction using the number of configuration information blocks in the configuration information list or can implicitly indicate the dimension number information of the reference signals using the subframe in which the configuration information list is positioned. In practice, the signal generator 510 may indicate one or more pieces of mode indication information using the list-related information comprehensively.

The signal generator 510 can further combine the implicit method and the explicit method to indicate the mode indication information. This can enhance the transmission of the mode indication information and ensure that the mobile station can reliably perform reception and accurately identify specific content. The signal generator 510 may configure the configuration information list in one CSI process to transmit the configuration information list or may configure the configuration information list in different CSI processes to transmit the configuration information list. The embodiment of the present disclosure is not limited to the process in which the configuration information list can be transmitted.

The transmitter 520 can transmit the mode indication information and the configuration information and subsequently transmit the reference signals. For example, when the transmission scheme information in the mode indication information indicates that the reference signals are NP CSI-RSs, the transmitter 520 can transmit each reference signal according to the resource indicated by the configuration information in which each reference signal is positioned without performing precoding. When the transmission scheme information in the mode indication information indicates that the reference signals are BF CSI-RSs, the transmitter 520 can perform precoding and transmit each reference signal according to the resource indicated by the configuration information in which each reference signal is positioned. When the dimension number information in the mode indication information indicates that the reference signals are signals in the horizontal direction, the transmitter 520 can transmit each reference signal with each azimuth angle in the horizontal direction based on the resource indicated by the configuration information in which each reference signal is positioned. When the dimension number information in the mode indication information indicates that the reference signals are signals in the horizontal direction and the vertical direction, the transmitter 520 can transmit each reference signal with a corresponding azimuth angle in the horizontal direction and a corresponding elevation angle in the vertical direction based on the resource indicated by the configuration information in which each reference signal is positioned.

Based on the reference signals from the base station, the mobile station can calculate channel state information corresponding to the transmission paths of the reference signals. The mobile station can also feed information such as the channel state information and a port number back to the base station. Accordingly, the base station 500 may further include a receiver 530 (as indicated by a dotted line of FIG. 5). The receiver 530 receives the feedback information from the mobile station and the feedback information includes the channel state information obtained based on the reference signals by the mobile station. The signal generator 510 generates communication data to be transmitted to the mobile station based on the feedback information and the transmitter 520 transmits the communication data to the mobile station. In other words, the signal generator 510 can determine the channel state between each antenna port of the base station and the mobile station based on the feedback information, accordingly generate data to be transmitted to the mobile station adopting an appropriate method, and cause the transmitter 520 to transmit the data.

Since the specific details of the process performed by the base station 500 according to the embodiment of the present disclosure are the same as the details described with reference to FIG. 2, the foregoing description made with reference to FIG. 2 can be referred to. The signal generator 510 may be realized by a storage unit and a controller. The storage unit can store a computer program and the controller can realize a process of the signal generator 510 by executing the computer program. The transmitter 520 may be realized by an antenna and a corresponding RF circuit and transmits a signal generated by the signal generator 510. The receiver 538 can be realized using an antenna and a corresponding RF circuit and can receive a signal from the mobile station and supplying the signal to the signal generator 510 for processing.

In the solution of the base station in the multi-antenna technology according to the embodiment of the present disclosure, by generating the mode indication information regarding the reference signals and transmitting the reference signals to the mobile station based on the mode indication information, it is possible to enhance and improve the capability to process reference signals. Thus, it is possible to not only perform control of a two-dimensional antenna array and but also apply compatible transmission and processing to the reference signals in different communication modes.

Figure 6:
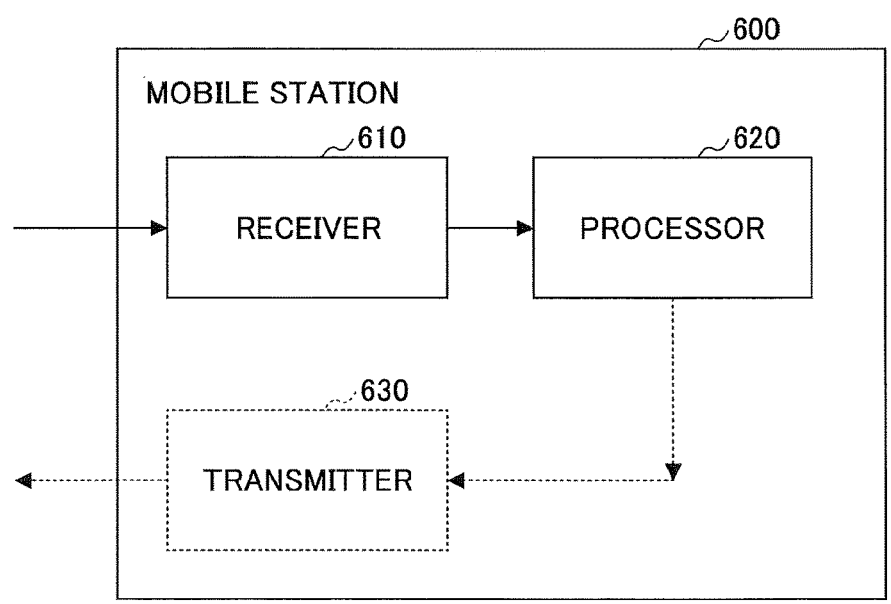
FIG. 6 is a block diagram illustrating a mobile station according to an embodiment of the present disclosure.

FIG. 6 is a block diagram illustrating a mobile station 600 according to an embodiment of the present disclosure. The mobile station 600 corresponds to the mobile station illustrated in FIG. 1. As illustrated in FIG. 6, the mobile station 600 includes a receiver 610 and a processor 620. The receiver 610 is used to receive mode indication information of reference signals to be transmitted and configuration information regarding the reference signals from the base station and receive the reference signals from the base station based on the mode indication information and the configuration information. The configuration information is used to indicate transmission resources configured for the reference signals. The processor 620 is used to obtain channel state information between the mobile station and the base station based on the received reference signals.

The receiver 610 receives the configuration information and the mode indication information of the reference signals from the base station. The mode indication information is used to indicate the transmission mode of the reference signals and, for example, may include at least one of dimension number information of the reference signals and transmission scheme information of the reference signals. In practice, the information can be appropriately selected as needed. The dimension number information of the reference signals may include at least one of the distribution of the reference signals in the vertical direction and the distribution of the reference signals in the horizontal direction.

when the received mode indication information includes the dimension number information of the reference signals, the receiver 610 can receive the configuration information corresponding to the dimension number information from the base station based on the dimension number information and can receive the reference signals in the vertical direction and the horizontal direction based on the configuration information corresponding to the dimension number information. Based on the mode indication information, the receiver 610 can further determine whether the reference signals are BF CSI-RSs or NP CSI-RSs. The configuration information received by the receiver 610 is used to indicate the transmission resources configured for the reference signals. For example, the information of the transmission resources configured for the reference signals may include at least one of a time resource and a frequency resource for transmitting each reference signal and may include information regarding an antenna port number or a beam identifier corresponding to the reference signal, the number of antennas, and the like.

According to the transmission method of transmitting the mode indication information and the configuration information by the base station, the receiver 610 can receive the mode indication information and the configuration information in accordance with a corresponding reception method. Specifically, when the base station separately transmits the mode indication information and the configuration information, the receiver 610 separately receives and processes the mode indication information and the configuration information. When the base station implicitly includes the mode indication information in the configuration information, the receiver 610 receives the configuration information and obtains the mode indication information from the configuration information. The embodiment of the present disclosure is not limited to the specific method of receiving the mode indication information and the configuration information by the receiver 610.

The receiver 610 can receive the mode indication information from the base station using at least one of the radio resource control signaling and the downlink control information of the physical downlink control channel and can receive the configuration information using the radio resource control signaling. In this embodiment, the mode indication information is explicitly indicated by a dedicated control bit and the receiver 610 separately receives the mode indication information and the configuration information. As an example, the receiver 610 can obtain the dimension number information of the reference signals from the dimension number indication bit in the radio resource control RRC signaling or the DCI, and can extract the scheme indication bit from the radio resource control RRC signaling or the DCI and determine the transmission scheme information of the reference signals.

The configuration information is typically transmitted with the radio resource control signaling. For example, the receiver 610 can receive the configuration information of the reference signals corresponding to the different antenna ports in a physical resource block. The RRC signaling or the DCI is used to transmit control information, but the transmission resources are limited. Therefore, by reducing content of the mode indication information, it is possible to reduce the occupied transmission resources. For example, the receiver 610 can first receive the mode indication information, determine dimension number information (for example, a distribution of the reference signals in the vertical direction) of the reference signals based on the dimension number indication bit in the mode indication information, and receive the configuration information corresponding to the dimension number information from the base station based on the dimension number information.

To reduce the resources occupied by the transmission mode indication information and enhance the transmission of the mode indication information, the base station may implicitly include a part of the mode indication information in the configuration information and transmit the mode indication information. In this case, the receiver 610 can receive a configuration information list related to the reference signals from the base station using the radio resource control signaling. The configuration information list includes one or more configuration information blocks each having an identification number. The list-related information of the configuration information list is used to indicate the mode indication information. The list-related information may include at least one of the identification number, the subframe number in which the configuration information list is positioned, and the number of pieces of the configuration information of the configuration information list. In this way, it is possible to ensure that the receiver 610 can reliably receive each piece of mode indication information and accurately identify specific content.

The mode indication information may be fully included in the configuration information and transmitted. In this case, the mobile station may not receive the mode indication information using at least one of the radio resource control signaling and the downlink control information but can receive the mode indication information and the configuration information regarding the reference signals from the base station as follows, that is, receive the configuration information list regarding the reference signals from the base station. The configuration information list includes one or more configuration information blocks each having the identification number, and the list-related information of the configuration information list is used to indicate the mode indication information. In this embodiment, the configuration information list is considered as the configuration information. The number of configuration information blocks included in the configuration information list is not limited to 1 and the mode indication information is implicitly included in the configuration information block and transmitted. The list-related information of the configuration information list may include, for example, at least one of identification numbers of the configuration information blocks, a subframe number in which the configuration information list is positioned, and the number of configuration information blocks in the configuration information list.

When the dimension number information of the reference signals includes the distribution of the reference signals in the vertical direction and the distribution of the reference signals in the horizontal direction, the receiver 610 can receive the dimension number information of the reference signals, receive the configuration information corresponding to the dimension number information from the base station based on the dimension number information, and receive the reference signals in the vertical direction and the horizontal direction based on the configuration information corresponding to the dimension number information. The receiver 610 can identify the distribution of the reference signals in at least one of the horizontal direction and the vertical direction based on the dimension number information. Accordingly, it is possible to increase the number of reference signals and it is possible to accordingly increase the number of radio transmission units or the number of mobile stations. The receiver 610 can further receive the reference signals adopting an appropriate method based on the transmission scheme indicated by the transmission scheme information. The embodiment of the present disclosure is not limited to the specific scheme which can be indicated by the transmissions scheme information.

After the receiver 610 receives the reference signals from the base station, the processor 620 can obtain channel state information between the mobile station and the base station based on the received reference signals. Based on the received reference signal corresponding to each antenna port, the processor 620 can calculate channel state information of a transmission path from each antenna port to the mobile station. The channel state information may be, for example, information regarding signal scattering, fading due to an environment, or fading due to a distance. Each transmission path can be indicated using the antenna port or may be indicated using the beam identifier. Accordingly, the processor 620 can estimate a channel environment in a multi-antenna system.

It is necessary for the processor 620 to obtain channel state information adopting different methods. For example, BF CSI-RS beams of the related art involve a dedicated transmission and processing method and NP CSI-RS beams of the related art also involve a dedicated transmission and processing method. Accordingly, based on the transmission scheme information in the mode indication information, it is necessary for the processor 620 to determine whether the reference signals are BF CSI-RSs or NP CSI-RSs. When the reference signals are BF CSI-RSs, a first process is performed on the reference signals to obtain the channel state. When the reference signals are NP CSI-RSs, a second process is performed on the reference signals to obtain the channel state. The second process is different from the first process.

When the reference signals are BF CSI-RSs, the processor 620 may perform the first process as follows. That is, the mobile station can calculate the channel state information, the antenna port number, and the like corresponding to each reference signal and determine an optimum reference signal which has an optimum channel condition and the antenna port number based on the calculated channel state information. When the reference signals are NP CSI-RSs, the processor 620 may perform the second process as follows. That is, the mobile station can calculate the channel state information, an antenna port number, and the like corresponding to each reference signal and combine the calculated channel state information to obtain new comprehensive channel state information.

The mobile station 600 may include a transmitter 630, as indicated by a dotted line of FIG. 6. The transmitter 630 can feed information such as the channel state information, the port number, and the like back to the base station. The base station can determine the channel state between the mobile station and each antenna port of the base station based on the feedback information, and accordingly can perform data communication with the mobile station adopting an appropriate method. Accordingly, the receiver 610 receives communication data from the base station. The communication data are transmitted from the base station based on the channel state.

When the reference signals are BF CSI-RSs, the transmitter 630 can feed the channel state information, the antenna port, and the like corresponding to the optimum reference signal as feedback information back to the base station. Alternatively, the transmitter 630 can feed the channel state information, the antenna port numbers, and the like of a predetermined number (for example, 3 or 5) of reference signals with higher priority of the channel condition back to the base station. Alternatively, the transmitter 630 can feed the channel state information, the antenna port numbers, and the like corresponding to all the reference signals back to the base station. When the reference signals are NP CSI-RSs, the transmitter 630 can transmit the obtained new comprehensive channel state information to the base station.

Since the specific details of the process performed by the mobile station 600 according to the embodiment of the present disclosure are the same as the details described with reference to FIG. 3, the foregoing description made with reference to FIG. 3 can be referred to. The receiver 610 may be realized by an antenna and a corresponding RF circuit and can receive a signal from the base station, extracting information, and supplying the information to the processor 620 for processing. The transmitter 630 may be realized by an antenna and a corresponding RF circuit and can receive a feedback signal from the processor 620 and transmit the feedback signal to the base station.

In the solution of the mobile station according to the embodiment of the present disclosure, by receiving the mode indication information of the reference signals and receiving the reference signals from the base station based on the mode indication information, it is possible to enhance and improve the capability to process the reference signals. Thus, it is possible to not only perform control of a full-dimensional antenna array and but also apply compatible transmission and processing to the reference signals in different communication modes.

<Hardware Configuration>

As described above, the block diagrams used to describe the functional configurations according to the foregoing embodiment illustrate blocks of functional units. The functional blocks (constituent elements) are realized by any combination of hardware and/or software. In addition, means for realizing each functional block is not specifically limited. That is, each functional block may be realized by one apparatus in which the functional blocks are combined physically and/or logically or may be realized by two or more apparatuses that are physically and/or logically separated by connecting the plurality of apparatuses directly and/or indirectly (for example, in a wired and/or wireless manner).

Figure 7:
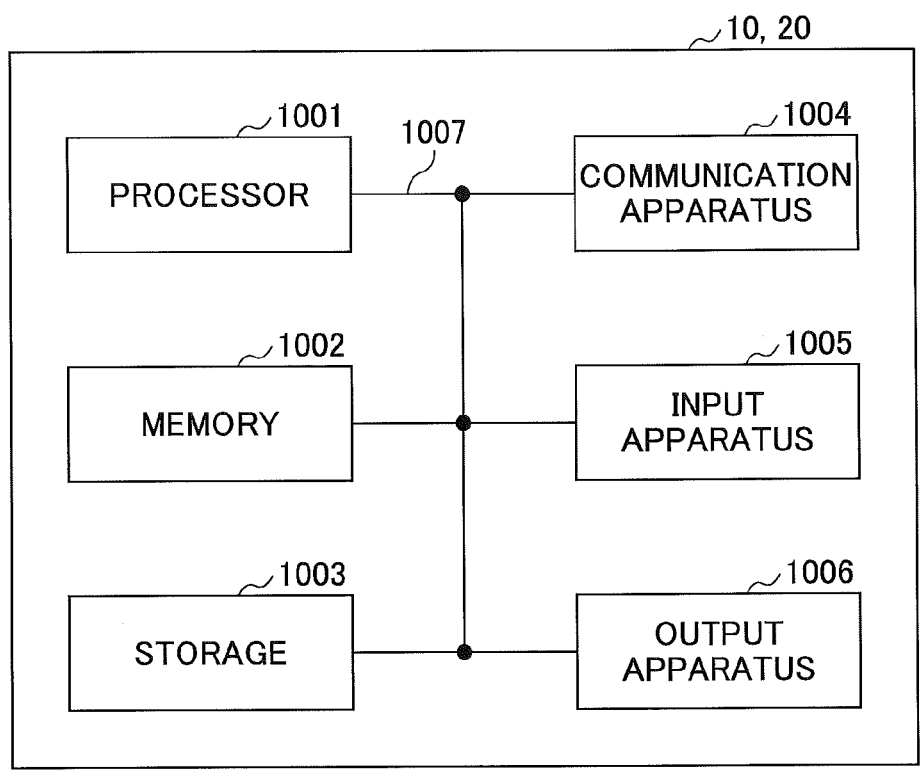
FIG. 7 is a diagram illustrating an example of a hardware configuration of a base station or a mobile station according to an embodiment of the present disclosure.

For example, a base station and a mobile station according to an embodiment of the invention may function as a computer that performs processes of an information transmission method or an information processing method according to the invention. FIG. 7 is a block diagram illustrating an example of a hardware configuration of the base station and the mobile station according to an embodiment of the invention. The base station 500 and the mobile station 600 as described above may be physically configured as a computer apparatus that includes a processor 1001, a memory 1002, a storage 1003, a communication apparatus 1004, an input apparatus 1005, an output apparatus 1006, and a bus 1007.

In the following description, a term "apparatus" can be replaced with a circuit, a device, a unit, or the like. The hardware configuration of the base station 500 and the mobile station 600 may be configured to include one apparatus or a plurality of apparatuses illustrated in the drawing or may be configured not to include some of the apparatuses.

The functions of the base station 500 and the mobile station 600 are realized by reading predetermined software (program) on hardware such as the processor 1001 or the memory 1002 so that the processor 1001 can perform an arithmetic operation and by controlling communication by the communication apparatus 1004 and reading and/or writing of data in the memory 1002 and the storage 1003.

For example, the processor 1001 controls the entire computer by operating an operating system. The processor 1001 may be also configured as a central processing unit (CPU) that includes an interface with a peripheral apparatus, a control apparatus, an arithmetic apparatus, a register, and the like. For example, the signal generator 510 and the processor 620 may be realized by the processor 1001.

The processor 1001 reads a program (program codes), a software module and/or data from the storage 1003 and/or the communication apparatus 1004 to the memory 1002 and performs various processes according to the program, the software module, or the data. As the program, a program causing a computer to perform at least some of the operations described in the foregoing embodiment is used. For example, the signal generator 510 of the base station 500 or the processor 620 of the mobile station 600 may be stored in the memory 1002 and realized by a control program that is operated by the processor 1001. Another functional block may be similarly realized. The various processes performed by one processor 1001 have been described, but the processes may be performed simultaneously or sequentially by two or more processors 1001. The processor 1001 may be implemented in one or more chips. The program may be transmitted from a network via a telecommunication line.

The memory 1002 is a computer-readable recording medium and may be configured by at least one of, for example, a read-only memory (ROM), an erasable programmable ROM (EPROM), an electrically erasable programmable ROM (EEPROM), and a random access memory (RAM). The memory 1002 may also be referred to as a register, a cache, a main memory (main storage apparatus), or the like. The memory 1002 can store a program (program codes), a software module, or the like which can be executed to perform an information transmission method and an information processing method according to an embodiment of the invention.

The storage 1003 is a computer-readable recording medium and may be configured by at least one of, for example, an optical disc such as a compact disc ROM (CD-ROM), a hard disk drive, a flexible disk, a magneto-optical disc (for example, a compact disc, a digital versatile disc, a Blu-ray (registered trademark) disc), a smart card, a flash memory (for example, a card, a stick, or a key drive), a floppy (registered trademark) disk, and a magnetic strip. The storage 1003 may be also referred to as an auxiliary storage apparatus. The above-described storage medium may be, for example, a database or a server including the memory 1002 and/or the storage 1003 or another appropriate medium.

The communication apparatus 1004 is hardware (a transmission and reception device) that performs communication between computers via a wired and/or wireless network and is also referred to as, for example, a network device, a network controller, a network card, or a communication module. For example, the transmitter 520, the receiver 530, the receiver 610, and the transmitter 630 described above may be realized by the communication apparatus 1004.

The input apparatus 1005 is an input device (for example, a keyboard, a mouse, a microphone, a switch, a button, or a sensor) that receives an input from the outside. The output apparatus 1006 is an output device (for example, a display, a speaker, or an LED lamp) that performs an output to the outside. The input apparatus 1005 and the output apparatus 1006 may be configured to be integrated (for example, a touch panel).

The apparatuses such as the processor 1001 and the memory 1002 are connected to the bus 1007 for communicating information. The bus 1007 may be configured as a single bus or may be configured by different buses between the apparatuses.

The base station 500 and the mobile station 600 may be configured to include hardware such as a microprocessor, a digital signal processor (DSP), an application specific integrated circuit (ASIC), a programmable logic device (PLD), or a field programmable gate array (FPGA), or some or all of the functional blocks may be realized by the hardware. For example, the processor 1001 may be implemented in at least one of the hardware.

<Supplements>

Each method according to an embodiment of the present disclosure may be realized by software. Therefore, in an embodiment of the present disclosure, a computer-readable program can be also provided, that is, the program can cause a computer to realize each of the above-described methods when the program is executed by the computer. Further, in an embodiment of the present disclosure, a computer-readable storage medium storing the above-described programs such as a hard disk, a magnetic disk, an optical disc, a DVD, or a flash memory, is also provided.

Regardless of the fact that software is referred to as software, firmware, middleware, a microcode, or a hardware description language or is referred to as another name, the software is broadly interpreted to mean a command, a command set, a code, a code segment, a program code, a program, a sub-program, a software module, an application, a software application, a software package, a routine, a subroutine, an object, an executable file, an execution thread, a procedure, a function, or the like.

Software, a command, or the like may be transmitted or received via a transmission medium. For example, when software is transmitted from a website, a server, or another remote source using a wired technology such as a coaxial cable, an optical cable, a twisted pair, and a digital subscriber line (DSL) and/or a wireless technology such as an infrared ray, radio, and microwaves, the wired technology and/or the wireless technology is included in the definition of a transmission medium.

The information, the signal, and the like described in the present specification may be represented using any of various technologies. For example, the data, the order, the command, the information, the signal, the bit, the symbol, the chip, and the like mentioned throughout the foregoing description may be represented by a voltage, a current, an electromagnetic wave, a magnetic field, or a magnetic particle, an optical field or a photon, or any combination thereof.

The terms described in the present specification and/or terms necessary to understand the present specification may be replaced with terms that have same or similar meanings. For example, a channel and/or a symbol may be a signal. A signal may be a message. A component carrier (CC) may be referred to as a carrier frequency, a cell, or the like.

The information, the parameter, or the like described in the present specification may be represented by an absolute value, may be represented by a relative value from a predetermined value, or may be represented by another piece of corresponding information. For example, a radio resource may be indicated using an index.

The names used for the above-described parameters are not limited in any respect. Further, a numerical expression or the like in which the parameters are used can be different from the numerical expression disclosed explicitly in the present specification. Since various channels (for example, PUCCH and PDCCH) and information elements (for example, TPC) can be identified with any appropriate names, various names allocated to the various channels and information elements are not limited in any respect.

The notification of information is not limited to the aspects/embodiments described in the present specification and may be performed in accordance with other methods. For example, the notification of information may be performed with physical layer signaling (for example, downlink control information (DCI) or uplink control information (UCI)), higher layer signaling (for example, radio resource control (RRC) signaling, medium access control (MAC) signaling, or broadcast information (master information block (MIB), or a system information block (SIB))), another signal, or a combination thereof. The RRC signaling may be referred to as an RRC message or may be, for example, an RRC connection setup message or an RRC connection reconfiguration message.

Each aspect/embodiment described in the present specification may be applied to a system in which Long Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-WideBand (UWB), Bluetooth (registered trademark), and other appropriate systems are used and/or a next generation system extended based on the system.

The order of the process procedure, the sequence, the flowchart, or the like of each aspect/embodiment described in the present specification may be interchanged unless there is contradiction. For example, in the method described in the present specification, various steps have been proposed in exemplary orders and the invention is not limited to the proposed specific orders.

In the present specification, a specific operation performed by the base station may be also performed by an upper node. In a network formed by one or more network nodes including a base station, it should be apparent that various operations performed to communicate with a mobile station may be performed by a base station and/or another network node (for example, an MME or an S-GW is considered, but the invention is not limited thereto) other than the base station. The case in which the number of other network nodes other than the base station is 1 has been exemplified above, but a combination of a plurality of other network nodes (for example, an MME and an S-GW) may be used.

Information or the like can be output from a higher layer (or a lower layer) to a lower layer (or a higher layer). Information or the like may be input or output via a plurality of network nodes.

The input or output information or the like may be stored in a specific location (for example, a memory) or may be managed with a management table. The input or output information or the like may be overwritten, updated, or edited. The output information or the like may be deleted. The input information or the like may be transmitted to another apparatus.

Determination may be made based on a value (0 or 1) represented by 1 bit, may be made based on a true or false value (Boolean: true or false), or may be made based on comparison with a numerical value (for example, comparison with a predetermined value).

The term "determining" used in the present specification may include a wide variety of operations. Regarding the "determining," for example, calculating, computing, processing, deriving, investigating, looking up (for example, looking up in a table, a database, or another data structure), and ascertaining may be considered as "determining." In addition, regarding the "determining," for example, receiving (for example, receiving information), transmitting (for example, transmitting information), inputting, outputting, and accessing (for example, accessing data in a memory) may be considered as "determining". In addition, regarding the "determining," for example, resolving, selecting, choosing, establishing, and comparing may be considered as "determining." That is, the "determining" can include a case in which any operation is "determined."

The term "connected" or "coupled" or any modification of the term means various types of direct or indirect connection or coupling between two or more elements and can include the presence of one or more intermediate elements between two mutually "connected" or "coupled" elements. The connection or the coupling between elements may be physical connection, logical connection, or any combination thereof. When the connection or the coupling is used in the present specification, two elements can be considered to be mutually "connected" or "coupled" by using one or more electric wires, cables, and/or printed electric connection and using electromagnetic energy such as electromagnetic energy with a wavelength of a radio frequency region, a microwave region, and a light (both visible light and invisible light) region as several non-limited and non-inclusive examples.

The description "based on" used in the present specification does not imply "based only on" unless otherwise specified. In other words, the description of "based on" implies both of "based only on" and "based at least on."

When reference is made to elements in which names "first," "second," and the like are used in the present specification, the number or the order of the elements is not generally limited. The names can be used in the present specification as a method to conveniently distinguish two or more elements from each other. Accordingly, reference to first and second elements does not imply that only two elements are employed or the first element is prior to the second element in some ways.

The terms "including" and "comprising" are intended to be inclusive as in the term "comprise" as long as "including," "comprising," and modifications thereof are used in the present specification or the claims. Further, the term "or" used in the present specification or the claims is intended not to be exclusive OR.

The aspects/embodiments described in the present specification may be individually used, may be combined, or may be switched during execution. In addition, notification of predetermined information (for example, notification of "being X") is not limited to being performed explicitly and may be performed implicitly (for example, the notification of the predetermined information is not performed).

The invention has been described in detail above, it should be apparent to those skilled in the art that the invention is not limited to the embodiments described in the present specification. The invention can be embodied in modified aspects and changed aspects without departing from the gist and scope of the invention defined in the claims. Accordingly, the description of the present specification is intended to describe examples and does not have any restrictive meanings to the invention.

The preferred embodiments of the present disclosure have been described in detail above, but the present disclosure is not limited to the embodiments and all modifications of the present disclosure without departing from the gist of the present disclosure belong to the technical scope of the present disclosure.

Priority is claimed on Chinese Patent Application No. 201510497275.5, filed on Aug. 13, 2015, the content of which is incorporated herein by reference.

The invention claimed is:

1. An information processing method used in a mobile station, the method comprising:
   receiving reference signals from a base station based on mode indication information including transmission scheme information regarding the reference signals; and
   obtaining channel state information based on the reference signals,
   wherein the transmission scheme information is used to indicate whether the reference signals are BF CSI-RSs or NP CSI-RSs, and
   wherein the channel state information is obtained by
      determining whether the reference signals are the BF CSI-RSs or the NP CSI-RSs based on the transmission scheme information,
      performing a first process on the reference signals and obtaining the channel state information when the reference signals are the BF CSI-RSs, and
      performing a second process on the reference signals and obtaining the channel state information when the reference signals are the NP CSI-RSs,
   wherein the second process is different from the first process.

2. A mobile station comprising:
   a receiver configured to receive reference signals from a base station based on mode indication information including transmission scheme information regarding the reference signals; and
   a processor configured to obtain channel state information based on the reference signals,
   wherein the transmission scheme information is used to indicate whether the reference signals are BF CSI-RSs or NP CSI-RSs, and
   wherein the processor is configured to
      determine whether the reference signals are the BF CSI-RSs or the NP CSI-RSs based on the transmission scheme information,
      perform a first process on the reference signals and obtain the channel state information when the reference signals are the BF CSI-RSs, and
      perform a second process on the reference signals and obtain the channel state information when the reference signals are the NP CSI-RSs, and
   wherein the second process is different from the first process.

3. The mobile station according to claim 2, wherein the receiver is configured to further receive dimension number information of the reference signals as the mode indication information from the base station.

4. The mobile station according to claim 3, wherein the receiver is configured to receive a configuration information list related to the reference signals from the base station by radio resource control signaling, and the configuration information list includes one or more configuration information blocks each having an identification number.

5. The mobile station according to claim 3, further comprising:
   a transmitter configured to transmit feedback information indicating at least one reference signal selected from the reference signals to the base station.

6. The mobile station according to claim 2, wherein the receiver is configured to receive a configuration information list related to the reference signals from the base station by radio resource control signaling, and the configuration information list includes one or more configuration information blocks each having an identification number.

7. The mobile station according to claim 6, further comprising:
   a transmitter configured to transmit feedback information indicating at least one reference signal selected from the reference signals to the base station.

8. The mobile station according to claim 2, further comprising:
   a transmitter configured to transmit feedback information indicating at least one reference signal selected from the reference signals to the base station.

9. The mobile station according to claim 8,
wherein the processor is configured to obtain the channel state information based on the selected at least one reference signal, and
wherein the transmitter is configured to transmit the channel state information to the base station.

\* \* \* \* \*